US008412640B2

(12) United States Patent
Dixon et al.

(10) Patent No.: US 8,412,640 B2
(45) Date of Patent: Apr. 2, 2013

(54) SIGNATURE BASED NEGATIVE LIST FOR OFF LINE PAYMENT DEVICE VALIDATION (75) Inventors: Phil Dixon, San Diego, CA (US); Ayman Hammad, Pleasanton, CA (US); William Alexander Thaw, South San Francisco, CA (US); Christian Aabye, Foster City, CA (US)

(73) Assignee: Visa U.S.A. Inc., San Francisco, CA (US)

( * ) Notice: Subject to any disclaimer, the term of this patent is extended or adjusted under 35 U.S.C. 154(b) by 172 days.

(21) Appl. No.: 12/883,919

(22) Filed: Sep. 16, 2010

(65) Prior Publication Data
US 2011/0016054 A1  Jan. 20, 2011

Related U.S. Application Data (62) Division of application No. 11/713,307, filed on Mar. 1, 2007, now Pat. No. 7,809,652.

(60) Provisional application No. 60/887,307, filed on Jan. 30, 2007.

(51) Int. Cl.
*G06F 17/60* (2006.01)

(52) U.S. Cl. ............... 705/76; 705/77; 705/78; 705/79; 705/64; 713/176; 713/177; 713/178; 713/17; 726/1

(58) Field of Classification Search ............... 705/76–79
See application file for complete search history.

(56) References Cited

U.S. PATENT DOCUMENTS

| 5,043,561 A | 8/1991 | Kimata |
| 6,792,536 B1 * | 9/2004 | Teppler ........................ 713/178 |
| 7,599,522 B2 | 10/2009 | Ito |
| 2002/0161729 A1 | 10/2002 | Andrews |
| 2005/0033688 A1 | 2/2005 | Peart et al. |
| 2006/0224470 A1 | 10/2006 | Garcia Ruano et al. |
| 2006/0278704 A1 | 12/2006 | Saunders et al. |
| 2007/0131761 A1 | 6/2007 | Smets et al. |
| 2008/0156873 A1 | 7/2008 | Wilhelm et al. |
| 2008/0242355 A1 | 10/2008 | Yue et al. |
| 2009/0283591 A1 | 11/2009 | Silbernagl |

FOREIGN PATENT DOCUMENTS

| WO | WO 00/16255 A1 | 3/2000 |
| WO | WO 0016255 A1 * | 3/2000 |
| WO | WO 2006/124808 | 11/2006 |

OTHER PUBLICATIONS

Nationmaster.com http://www.statemaster.com/encyclopedia/Mybi. Retrieved online May 10, 2010. © 2003-2005.*

(Continued)

*Primary Examiner* — James A Reagan
(74) *Attorney, Agent, or Firm* — Kilpatrick Townsend & Stockton LLP (57) ABSTRACT At each of a plurality of transit readers of a transit system, for each of a plurality of riders, where each rider seeks to conduct an access transaction with the transit system for access into the transit facility by using a payment device issued by an issuer in a payment system, data is read from the payment device. The data includes an encryption code that uniquely corresponds to the payment device and was created by the issuer using one or more encryption keys and a predetermined algorithm. A check will be performed, remotely and/or locally, of one or more lists of other encryption codes to determine if the encryption code is on the list. On the basis of whether the encryption code is on the list, the rider is permitted access to the facility of the transit system. The payment device need not be changed for the rider's fare. Decryption of the encryption code read from the payment device is not required to complete the access transaction.

23 Claims, 7 Drawing Sheets

OTHER PUBLICATIONS

Office Action in U.S. Appl. No. 11/681,176 dated Apr. 19, 2011.
Office Action in U.S. Appl. No. 11/681,174 dated Mar. 14, 2011.
Notice of Allowance mailed Mar. 27, 2012 in U.S. Appl. No. 11/681,175, 8 pages.

* cited by examiner

SIGNATURE BASED NEGATIVE LIST FOR OFF LINE PAYMENT DEVICE VALIDATION

CROSS-REFERENCE TO RELATED APPLICATIONS

This is a divisional application of U.S. patent application Ser. No. 11/713,307, filed on Mar. 1, 2007, titled "Signature Based Negative List For Off Line Payment Device Validation," now U.S. Pat. No. 7,809,652, which claims priority to U.S. Provisional Application Ser. No. 60/887,307, filed on Jan. 30, 2007, titled "Contactless Bank Card Transit Payment," both of which are incorporated herein by reference.

BACKGROUND

The present invention relates generally to financial transactions, particularly to customers requesting financial transactions with merchants, and more particularly to financial transactions conducted with a financial institution portable payment device issued by a financial institution, such as a credit card that, that may be used both in a retail transaction and in a transit fare transaction.

Portable payment devices can take many forms and are used in a great variety of financial transactions. The portable payment devices can comprise, for example, smart cards, payment tokens, credit cards, debit cards, stored value cards, pre-paid cards contactless cards, cellular telephones, Personal Digital Assistant (PDA) devices, key fobs, or smart cards. The financial transactions can involve, for example, retail purchases, transit fares, access to venue fares, etc. In all such transactions, the portable payment device users (consumers) are concerned with convenience and the merchants with whom they deal are concerned with ease of transacting with their customer-consumers.

Preferably, financial institution portable payment devices issued by a financial institution (FIPPD) are used in an on-line fashion (e.g., a point of service that is connected to a payment processing system during a transaction). The information from the FIPPD may be transmitted on-line to an issuer during a retail payment transaction for purposes of authorizing the use of the FIPPD for that transaction. The issuer may review parameters of the transaction such as transaction amount, credit history, card authenticity, and other factors when determining whether or not to authorize or decline the transaction.

However, some merchant transactions are not on-line such that FIPPD authentication and verification schemes are not readily accommodated. For example, the ability to go on-line in a transit environment such as a subway or bus system, or a venue access environment such as a stadium or concert hall, may be problematic because of the lack of real time communication and lack of network systems for such environments. This is due in part to the need in such environments to process a transaction within about 300 ms, a transit system industry standard, and thereby allow 30 to 45 patrons per minute access into a facility of the transit system such as a subway or a bus. Moreover, a bus on an over-the-road bus route may not have wireless or other communication systems to allow any real-time dialogue with any other systems outside of the bus, such as for on-line fare assessment or on-line admission ticket/voucher/card authorization. Therefore this absence of network connectivity in a transit environment presents a difficulty whenever an on-line authentication of the consumer's means of access, such as an admission ticket, voucher, or access card, is necessary in order to determine whether, for instance, the consumer is entitled to access and has sufficient funds to cover the cost of the desired transaction (fare for riding on the transit system).

Moreover, in a transit environment, the value of the transit fare may not be known at the time of requested access. A fare calculation may depend upon the actual travel distance, direction of travel, station entry and exit locations, mode of travel (subway, bus, water taxi), consumer category (student, senior), and/or times of use (peak, off-peak). Such parameters may be unknown prior to rendering the service. As such, the transit fare payment and collection process cannot be performed effectively using a conventional on-line authentication and approval process.

Traditionally, transit fare calculation and collection have occurred in a closed system. In a closed system, the transit company may issue its own transit portable payment device, such as a read/write smart card, wherein the transit portable payment device carries the necessary credentials and data to allow completion of a transaction at the fare device itself (turnstile, fare box, or other Point of Service). In this case, there is no additional processing required for fare determination at the time of the transaction outside of the interaction between the card and the fare device. Rather, the card is authenticated and read by the fare device, logic is performed by the fare device to apply transit system fare policy, and the card is updated (rewritten) to finalize the transaction details including a deduction of any stored value for the cost of fare. The fare device may additionally query a white list, a positive list, a hot list, a negative list and/or a black list utilizing the card number, for example, to determine whether the transaction will be completed and the cardholder will be allowed access into a facility of the transit system such as a subway terminal or bus passenger compartment.

The closed transit system, however, has its drawbacks. In a closed transit system, the transit portable payment device and transit readers at each station or route must be able to perform fare computations based on data stored and retrieved from a rider's access card, and subsequent card terminals/readers must be able to access data written to the rider's access card at previous stations. This requirement places a significant processing burden on the transit system terminals and/or fare processing systems and increases the cost of implementing the infrastructure for such systems. As fare rates and other relevant information generally change over time, this also increases the demands placed upon such systems for maintenance of accuracy.

Moreover, one transit portable payment device may not be compatible with all of the fare devices within a rider's travel plan. This can become a significant problem if a consumer wishes to utilize more than one transit system during a day's commute, such as by using multiple transit agencies or venues within a single geographical area that provide ridership both in and among different jurisdictions, cities or locations.

The present transit environment presents several challenges, including:

A common necessity that there can be only one transit portable payment device for each transit agency or group of cooperating agencies that cannot be used for other such agencies or groups;

The desire to accommodate transit system user's transaction speed expectations while minimizing risk to the transit agency for collecting payment for services rendered; and When a portable payment device is 'read-only,' not having write capabilities at the Point of Service, the PP devices cannot store the rider's transit chronology data—thus making the rider's fare calculations somewhat difficult with such devices. With such off-line transactions, a list (i.e., a white list of eligible cards or a negative list of rejected cards based on the unique card number) stored at each transit fare device is the primary mechanism to deter fraud. This is sub-optimal since the negative list would presumably grow unbounded as more FIPPD are issued.

In addition to the transit system rider's desire for a fast transaction speed when accessing a transit system facility, there are security and other risks associated with the use of a FIPPD that is designed for on-line authorization when it is otherwise used in an off-line transaction. These risks include, but are not limited to:

Authentication/Fraud: the lack of FIPPD authentication in real time creates a high potential for fraud through counterfeiting techniques;

Fare Cost Calculation: where the cost of a transit transaction is dependent upon the immediate rider history for the card (entry/exit/length of travel, transfers, etc.), the rider's transit fare cannot be calculated at each gate or fare box because the rider's immediate history of travel cannot be stored, written or resident on conventional FIPPDs.;

Data Security/Storage: protection of consumer data in a transit fare system may prove difficult. Tracking data in the form of a primary account number (PAN) for a FIPPD would require the transit system to collect and store this data securely, which is not something transit fare systems commonly do presently. If implemented, this requirement presents added cost and security concerns to both the transit system and its riders; and Payment cards are generally required to go on-line to the issuer during the transaction for purposes of authorizing the use of the card for that transaction. The issuer may review such parameters as transaction amount, credit history, card authenticity, and other factors when determining whether or not to authorize the transaction.

In some payment applications the opportunity to go on-line to the issuer for authorization may not be possible at the time of the transaction. This may be due to transaction speed requirements, and/or connectivity requirements at the payment device. For example, a transit fare device such as a subway turn style or bus fare box must complete a transaction within less than 300 milliseconds to allow time to process 30 to 45 passengers per minute as required in that application. In another example, a transit bus or a taxicab may be on the road without real-time communications with the issuer for authorization. In these cases, the merchant (transit agency, taxicab driver, etc) must allow the transaction to take place without authorization and then process the transaction at a later time after the cardholder is allowed to proceed.

Because the cardholder is allowed to proceed in advance of receiving authorization from the issuer, there is opportunity for fraud. The issuer is not allowed the opportunity to authenticate the card or authorize based on other parameters of the transaction, a fraudster with a counterfeit card would be allowed to proceed with the transaction without any checks and balances.

One mechanism widely used to curb counterfeit fraud in off-line applications is through the implementation of a negative list (sometimes referred to as black list or hot list). Each off-line payment processing device (such as a bus fare box) is provided, on a regular basis, with a list of card numbers thought to be counterfeit (or fraudulent for other reasons). During the processing of the transaction, the payment device may check the card number against the negative list and allow or deny the transaction based on this check and balance.

Although negative list checks provide a mechanism for curbing fraud in off-line applications, the negative list itself opens the door to other types of fraud opportunity based on the potential exposure of the card numbers on the negative list. In the case of a payment card being used to pay for transit fares, taxi fares, or vending machine goods, a negative list would necessarily be made of payment card account numbers (i.e. Primary Account Numbers, or PANs). The PAN is the only number provided by the card during the payment transaction and therefore would be the number placed on the negative list to deny its use. If the negative lists were exposed or compromised, the opportunity for large lists of payment card account numbers would be possible.

Different payment processors can maintain different cardholder information security and protection programs as well as requires merchant systems that process cardholder information, such as payment card numbers (PAN's), to be compliant with these programs. These security and protection programs can provide protection by requiring that cardholder information that must be stored, be done within one or more different encrypted formats. This includes off-line transit fare devices, taxicabs, or vending machines that would have to store PAN numbers in the form of negative lists. However, not all merchants have encryption systems or processes imposed stringently to protect cardholder data as required. Furthermore, encryption techniques may not be secure enough for unattended devices found in remote locations that may be vulnerable to physical attack, hacking, and exposure of payment account information.

Given the foregoing, it would be an advance in the art to protect cardholder information, stored in negative lists in off-line applications. It would further be an advance in the art to provide such protection in any off-line environment such as transit fare collection, taxi cabs fare payment, vending machines payments, venue access, parking meters or machines, or other applications that may not have connectivity or time permitted to go on-line to the issuer for payment authorization—including where the environment permits smart or 'chip' cards, whether the card or other payment device is a contact or contactless wireless (e.g.; Radio Frequency) card as are typically found in the transit environment.

What is still further needed in the art is the payment and collection of transactions utilizing a FIDDP device within the above environments, including access fares to transit systems and venues, that overcome the challenges and disadvantages of the prior art as set forth above.

SUMMARY

A payment transaction can be conducted in a combined scheme utilizing a financial institution portable payment device (FIPPD). During a consumer's transaction with a merchant for a good or service, information from the FIPPD can be read at a point of service (POS) terminal.

In one implementation, read is read at the POS terminal at a merchant at which a payment device is presented to the POS terminal by a consumer seeking to conduct a transaction for a good or server from the merchant. The payment device includes a Primary Account Number (PAN) issued by an issuer in a payment processing system. The data read from the payment device includes a non-PAN signature that corresponds to the PAN. A check is made of a list of non-PAN signatures maintained by the POS terminal to determine if the non-PAN signature read from the data on the payment device is on the list. On the basis if whether the non-PAN signature is on the list, the consumer is permitted to complete the transaction with the merchant.

In another implementation, a consumer (rider) may seek access into a transit facility at a transit POS terminal using a FIPPD associated with an account within a payment processing system. The transit POS may have a reader, such as a contactless card reader, that collects data from a data storage region of the FIPPD, including the FIPPD's account information. The data in the storage region of the FIPPD, along with other transaction information such as the time of day and transit POS location, after retrieving the same, can then be stored at a location different from the transit POS.

The data in the storage region of the FIPPD that is read by the reader occurs when a payment device is presented to the transit system reader by a rider seeking to conduct an access transaction for access to a facility of the transit system. The payment device includes a Primary Account Number (PAN) issued by an issuer in a payment processing system. The data read from the payment device includes encryption code uniquely corresponding to the payment device. Without decrypting the encryption code, a checking is made off line at the transit system reader of a list of other encryption codes to determine if the encryption code is validation may be based on the list, and on the basis if whether the encryption code is on the list, the rider is permitted access to the facility of the transit system.

In yet another implementation, data is read at a transit reader in a transit system at which a payment device is presented to the transit system reader by a rider seeking to conduct an access transaction for access to a facility of the transit system. The data is in the Track 1 and/or Track 2 data fields in accordance with a MSD configuration, and the payment device includes a Primary Account Number (PAN) issued by an issuer in a payment processing system. The data read from the payment device includes encryption code that uniquely corresponds to the payment device, where the encryption code has been stored on the payment device by the issuer, and created using one or more encryption keys and a predetermined algorithm. A check of the encryption code is made at the transit system reader against a list of other such encryption codes to determine if the encryption code is on the list. Without decrypting the encryption code, the rider is permitted access to the facility of the transit system on the basis if whether the encryption code is on the list.

In each of the foregoing implementation, the list that is checked can be a white list, a black list, or a combination thereof that is updated based on merchant or transit system's policies.

BRIEF DESCRIPTION OF THE DRAWINGS

The subject invention will be described in the context of the appended drawing figures, where the same numbers are used throughout the disclosure and figures to reference like components and features.

DETAILED DESCRIPTION

Implementations facilitate the protection of cardholder information used to validate a transaction between a merchant and consumer. The cardholder information is transformed by the merchant through the use of a card signature. The transformed cardholder information can be checked against one or more lists kept remote from both the issuer of the cardholder information and remote from a point of service terminal at which the consumer transacts with the merchant. The cardholder information stored on a payment device and used by the consumer need not be altered during the transaction.

The card signature can be a cryptographic value, such as one that is based on encryption keys and an algorithm that is personalized (stored) on a contactless card by the issuer of the payment card, payment device, etc. The card signature, for instance, can be calculated and validated at the payment device (such as a Point of Sale (POS) terminal, a transit agency fare box, a vending machine, etc.), thus providing a mechanism to detect and prevent the use of counterfeit cards that will not contain the proper cryptographic value. Here, this mechanism prevents the use of counterfeit cards because the card was not created with the proper algorithm or keys. Rather, the card signature value will be based on some set of data, such as a value that is unique to each card and can be calculated based on encryption techniques. The card signature number can be a type of encryptogram based on specific card data, algorithm, and keys. The number (i.e.; the signature) that is used in the negative listing process can be designed such that is would not resemble a payment account number and would not be accepted in any payment environment.

Example off-line environments include transit fare collection, taxi cabs fare payment, vending machines payments, venue access, parking meters or machines, and other applications that may not have connectivity or the necessary time required in order to on-line to the issuer of the payment device offered by the consumer (e.g.; the cardholder) for payment.

Implementations facilitate the payment and collection of transactions. The transaction value of each transaction may not be known at the time that a consumer in the transaction receives from a merchant one or more goods or services associated with the transaction. Mechanisms are provided to curb fraud through the use of one or more lists kept by the merchant. These lists can include all possible account numbers (e.g.; a white list) or only those account numbers that are not valid (e.g.; a negative list system, sometimes referred to as "black list" or "hot list"). The implementations, however, change each such accounts numbers in a proxy thereof using a cardholder signature so that the account number cannot be known.

Transactions use a financial institution portable payment device (FIPPD). As used herein, a FIPPD is intended to be broadly understood as being a portable payment device associated with an account within a payment system. The account may be a credit account, a debit account, a stored value account (e.g., a pre-paid account, an account accessible with a gift card, an account accessible with a reloadable card). As such, the FIPPD may be a (handheld) device such a cellular telephone, a MP3 player, a Personal Digital Assistant (PDA), a key fob, a mini-card, a keychain device (such as the Speedpass™ commercially available from Exxon-Mobil Corp.), a proximity contactless payment device such as one that complies with the International Organization for Standardization (ISO) 14443, a substrate bearing an optically scannable data region, a smart card, or integral and/or accessorized elements rendering the same functional equivalent of and to a contactless bank card associated with a payment system. A contactless payment device is a device that incorporates a means of communicating with a portable payment device reader or terminal without the need for direct contact. Thus, such portable payment devices may effectively be presented in the proximity of a portable payment device reader or terminal. A smart chip is a semiconductor device that is capable of performing most, if not all, of the functions of a smart card, but may be embedded in another device. Such contactless devices typically communicate with the portable payment device reader or terminal using RF (radio-frequency) technology, wherein proximity to an antenna causes data transfer between the portable payment device and the reader or terminal.

Typically, an electronic payment transaction is authenticated if the consumer conducting the transaction is properly authorized and has sufficient funds or credit to conduct the transaction. Conversely, if there are insufficient funds or credit in the consumer's account, or if the consumer's portable payment device is reported as lost or stolen, then an electronic payment transaction may not be authorized. In the following description, an "acquirer" is typically a business entity (e.g., a commercial bank) that has a business relationship with a particular merchant. An "issuer" is typically a business entity (e.g., a bank) which issues a portable payment device such as a credit, debit, or stored value card to a consumer. Some entities may perform both issuer and acquirer functions. The cardholder may offer to the merchant a chip card, wither contact or contactless, such as a Radio Frequency (RF) card as typically found in the transit environment.

Prior to further discussing the use of the FIPPD that is capable of combined payment and transit functions, and the possible scenario of an issuer acting as an intermediary or trusted third party, a brief description of the standard electronic payment operation will be presented. Typically, an electronic payment transaction is authorized if the consumer conducting the transaction is properly authenticated and has sufficient funds or credit to conduct the transaction. Conversely, if there are insufficient funds or credit in the consumer's account, or if the consumer's portable payment device is on a negative list (e.g., it is indicated as possibly stolen), then an electronic payment transaction may not be authorized. In the following description, an "acquirer" is typically a business entity (e.g., a commercial bank) that has a business relationship with a particular merchant. An "issuer" is typically a business entity (e.g., a bank) which issues a portable payment device such as a credit, debit, or stored value card to a consumer. Some entities may perform both issuer and acquirer functions.

In standard operation, an authorization) request message is created during a consumer purchase of a good or service at a point of sale (POS) using a portable payment device. An issuer validation request message can be sent from the POS terminal located at a merchant to the merchant's acquirer, to a payment processing system, and then to an issuer. The "issuer validation request message" can include a request for issuer validation to conduct an electronic payment transaction. It may include one or more of an account holder's payment account number, currency code, sale amount, merchant transaction stamp, acceptor city, acceptor state/country, etc. An issuer validation request message may be protected using a secure encryption method (e.g., 128-bit SSL or equivalent) in order to prevent data from being compromised.

Figure 1:
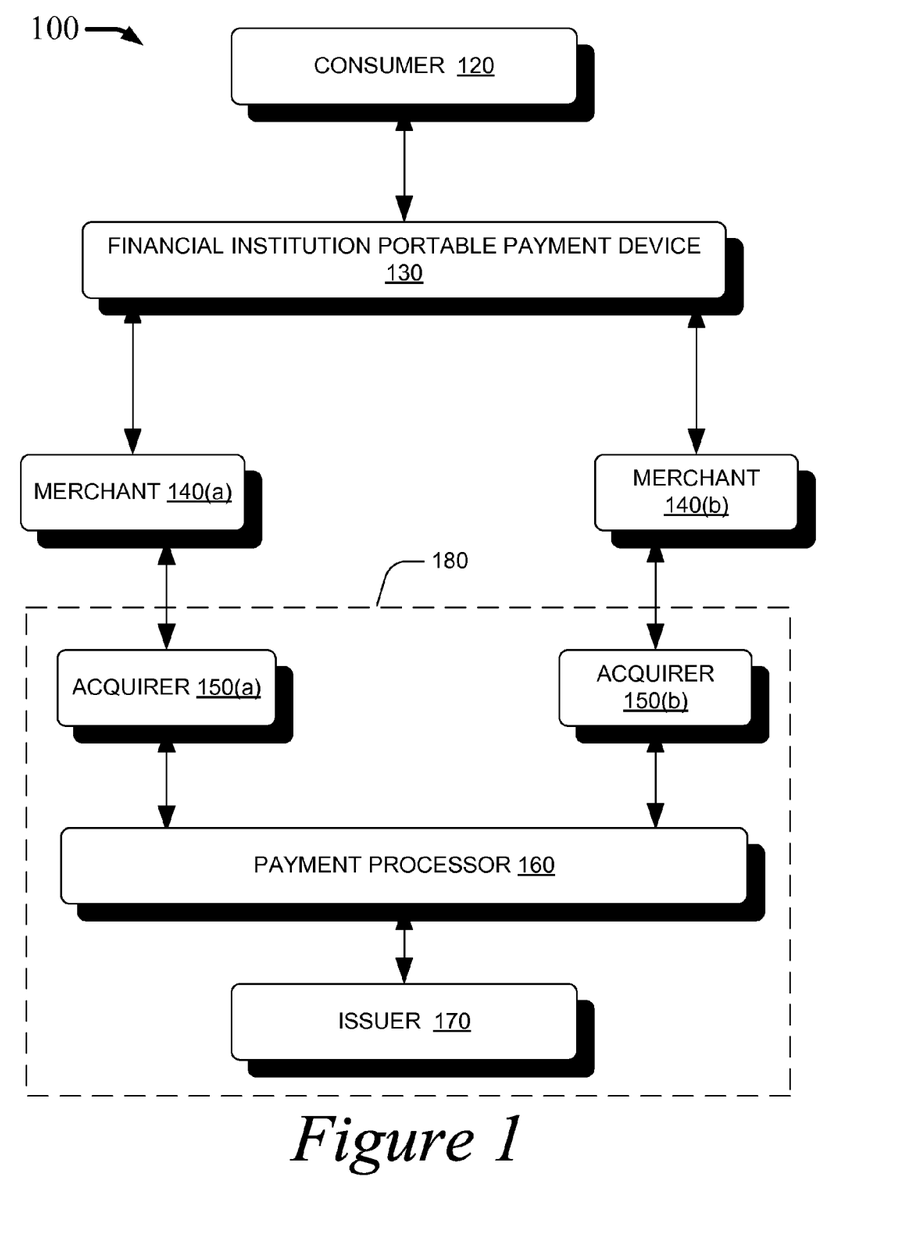
FIG. 1 is a block level diagram illustrating an exemplary payment processing system.

Referring to FIG. 1, one implementation of a payment system 100 compatible with a FIPPD is illustrated. The payment system 100 includes, a plurality of merchants 140 associated with one or more acquirers 150, and issuers 170. Each merchant 140 may have one or more merchant locations 140(a), 140(b) with acquirers 150(a) and 150(b) associated with those merchant locations, where 'a' can be a value from 1 to 'A' and 'b' can be a value from 1 to 'B'. The different merchant locations 140(a), 140(b) may be affiliated with a single merchant. A consumer 120 may purchase a good or service at the merchant locations 140(a), 140(b) using a FIPPD 130. The acquirers 150(a), 150(b) can communicate with an issuer 170 via a payment processor 160.

The FIPPD 130 may be in many suitable forms. As stated previously, the FIPPD 130 can be a mobile device that incorporates a contactless element such as a chip for storing payment data (e.g., a BIN number, account number, etc.) and a wireless data transfer (e.g., transmission) element such as an antenna, a light emitting diode, a laser, a near field communication component, etc. The FIPPD 130 may also be used to perform debit functions (e.g., a debit card), credit functions (e.g., a credit card), or stored value functions (e.g., a stored value card).

The payment processor 160 may include data processing subsystems, networks, and other means of implementing operations used to support and deliver issuer validation services, exception file services, and clearing and settlement services for payment transactions. The acquirer 150, payment processor 160, and the issuer 170 make up a payment processing system 180.

The payment processor 160 may include a server computer. A server computer is typically a powerful computer or cluster of computers. For example, the server computer can be a large mainframe, a minicomputer cluster, or a group of servers functioning as a unit. In one example, the server computer may be a database server coupled to a web server. The payment processor 160 may use any suitable wired or wireless network, including the Internet.

The merchant 140 typically has a point of sale (POS) terminal (not shown) that can interact with the FIPPD 130. Any suitable point of sale terminal may be used, including device (e.g., card) readers. The device readers may include any suitable contact or contactless mode of operation. For example, exemplary card readers can include RF (radio frequency) antennas, magnetic stripe readers, etc., to interact with the FIPPD 130.

As noted, a desirable element of the standard electronic payment transaction system is the entity responsible for the account management functions involved in the transaction. Such an entity may be responsible for ensuring that a user is authorized to conduct the transaction (via an on-line issuer validation by issuer 170 such as issuer 170 authentication), confirm the identity of a party to a transaction (via receipt of a personal identification number), confirm a sufficient balance or credit line to permit a purchase, and reconcile the amount of purchase with the user's account (via entering a record of the transaction amount, date, etc.). Also, such an entity may perform certain transit related services in addition to the standard transaction services.

For example, the payment transaction processing entity may be responsible for communicating with one or more transit agency computer systems to provide authentication data (by generating and/or distributing keys) for control of access to transit systems, process data obtained from a transit user's mobile device to associate transit system user identification data with an account used to pay for the transit expenses, generate billing records for transit activities, etc. Note that a trusted third party may also perform some or all of these functions, and in that manner act as a clearinghouse for access control data and/or transit activity data processing.

Figure 2:
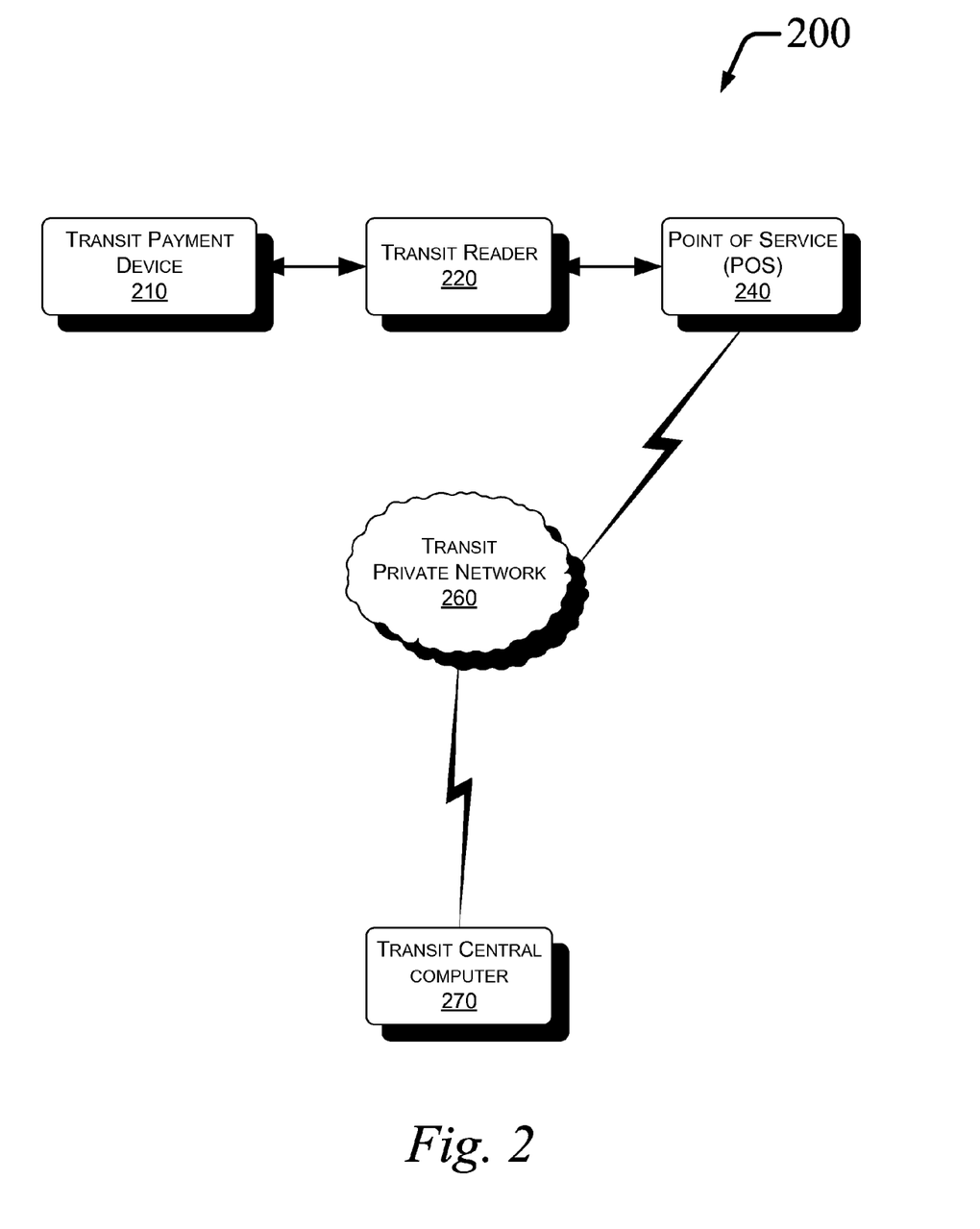
FIG. 2 is a block level diagram illustrating an exemplary closed transit processing system.

Referring now to FIG. 2, transit fare collection is typically accomplished in a closed transit processing system 200—the transit portable payment device 210 being issued by the transit system and the fare being calculated at the transit POS 240. The transit POS 240 may be a fare box or a turnstile with a transit system reader 220, such as a contactless card reader. The transit POS 240 collects and stores data such as the card identification number, card transaction history, card validity information, etc. The transit POS 240 and the transit portable payment device 210 validate each other, typically utilizing encryption algorithms and keys. The transit POS 240 then requests the data from the transit portable payment device 210. The transit reader 220 and transit POS 240 process the data from the transit reader 220 and apply the fare policy rules for the transit agency. Processing of the fare rules will result in a determination of a fare value, followed by the decreasing from the transit portable payment device 210 of value or number of rides, or application of a pass (like a monthly pass.) The transit portable payment device 210 is updated through writing information back to the transit portable payment device 210 as necessary to document the transaction on the transit portable payment device 210.

If one transaction has an impact on the cost of the next transaction, as in the case of a discounted transfer when the patron transfers to the next leg of the journey, the appropriate transit portable payment device 210 history is available at the time of the transfer transaction. The information stored on the transit portable payment device 210 is available to make determination of the cost of the fare at the moment of the transaction. There is no need to query any other computers or servers to complete the transaction at the fare device and the rider is allowed to enter the access facility.

Figure 3:
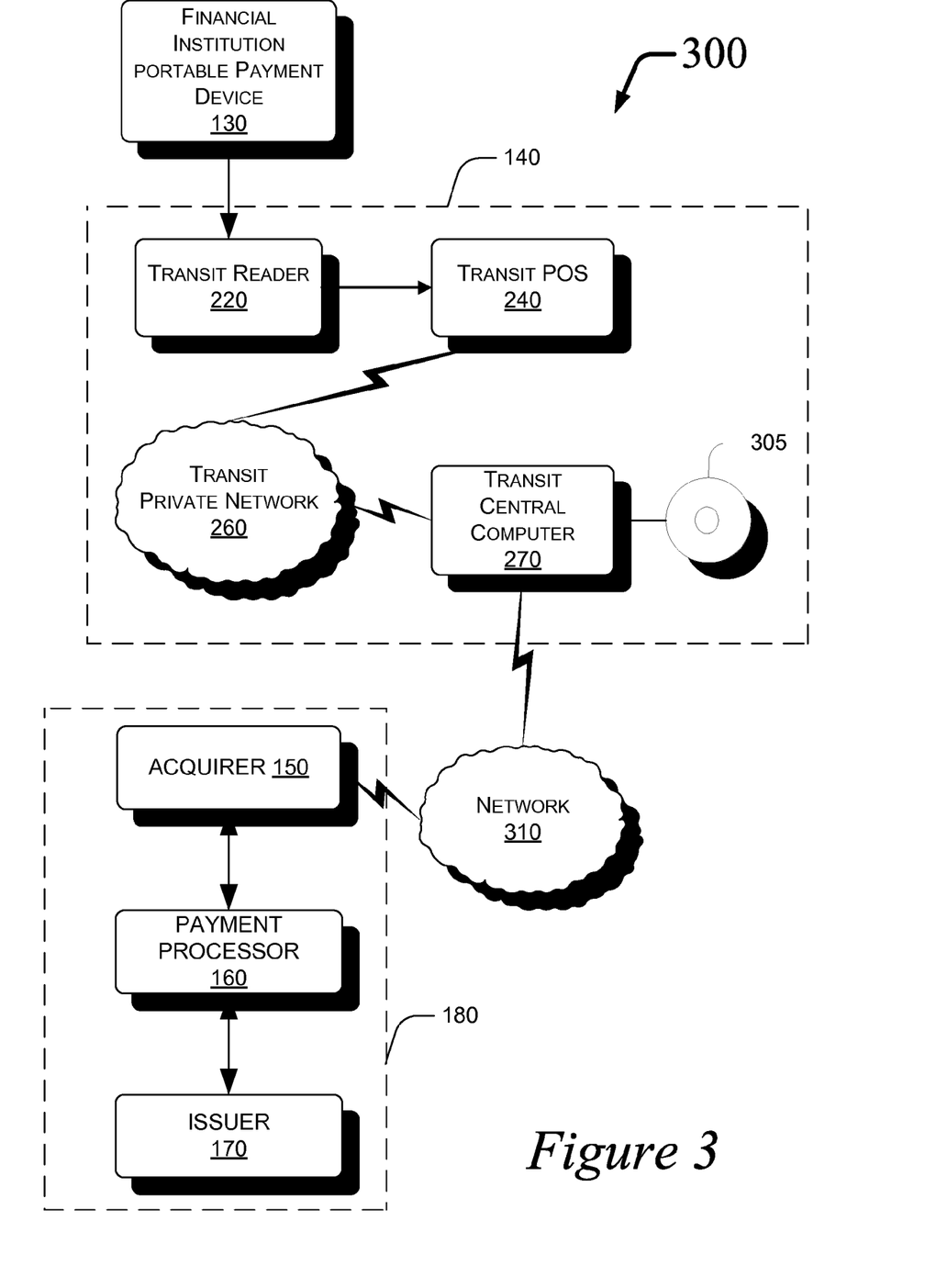
FIGS. 3-4 are block level diagrams illustrating an exemplary open transit processing system which is compatible with the payment processing system seen in FIG. 1.

After the transaction is complete, the fare transaction information is typically transferred to transit central computer 270 via the transit private network 260 for purposes of accounting, reporting, and fraud determination. Transit portable payment device 210 is uniquely identified by a transit account number, and is tracked for out of balance values, velocity, or use-rules. If the fraud rules are broken and the transit portable contactless device 210 is determined to have associated fraud, the transit portable payment device 210 number may be placed on a negative or positive list that may be kept in a storage that is accessible to the transit central computer, such as is seen in FIG. 3 at reference number 305 and described below. The hot list may be sent to each transit POS 240 for use as a validation component at the time of the transaction. For example, if the transit portable payment device 210 identification number is found on the hot list, the transit portable payment device 210 may be denied for entry into the transit system.

Referring now to FIG. 3, a FIPPD 130 can be used in a scheme to conduct a transaction within an open access system 300. Implementation of an access fare application does not allow the opportunity for the payment transaction to go on-line to the issuer 170 for an issuer validation (e.g., authorization) at the time of the transaction as would occur with the merchant 140, such as a retail merchant. This is due in part to the need to process a transaction in less than a second, typically within about 300 ms—a transit system industry standard, to allow 30 to 45 patrons per minute into the transit facility (hereafter referred to as the "access period"). The ability to go on-line in the transit environment may also be problematic because of the lack of real time communication and network systems. For example, buses are on the road and may not have wireless or other communication systems to allow real-time dialogue with any other systems outside of the bus. Consequently, one implementation combines a scheme of processes to conduct a fare transaction, such as has been illustrated in FIG. 3.

For example, a rider may present the FIPPD 130 at the transit POS having the transit reader 220. The transit reader 220 can capture from the FIPPD 130 financial institution account information, such as Magnetic Stripe Data (MSD), in an off-line mode (e.g., without communicating with the payment processing system 180). The transit reader 220 may read all of a track data, or just part of the track data such as a primary account number (PAN) associated with the FIPPD 130. The track data, along with other transaction information, such as the time of day and the location of the transit POS 240, can be transmitted to the transit central computer 270 via the transit private network 260. At this point, however, the fare value may not be known. Nevertheless, the consumer is given access to the transit facility.

The transaction information can be stored and analyzed at the transit central computer 320. The transit central computer 320 may have a database containing transit transaction history for all riders that use the transit system. The transit transaction history can be updated with each FIPPD 130 usage at the transit POS 240 or it may be updated on a batch basis.

The transit transaction history may be accessed to calculate the value of a fare off-line. For example, a set of the transit transaction history within the database can be accessed based on the PAN read from the FIPPD 130 at each transit event (e.g., entry, transfer, or exit) using the FIPPD 130; the transit transaction history may then be put into a chronological order of transit events; and the transit fare can be derived using the chronology of transit events on the basis of predetermined transit agency rules and policies.

Once the fare value is derived, the transaction can be processed in communication with the payment processing system 180 as would a standard on-line retail transaction with the merchant 140. The fare value can be transmitted to the payment processing system 180 via the on-line network 310. Once transmitted, the fare value can be authorized, cleared and settled—as described for the payment system 100—with the merchant 140.

A process can be used through which the FIPPD 130 can be used in the open transit system 300. The process begins at a first step where data from the data storage region of the FIPPD 130 associated with an account within the payment system 100 is read. The data can include all of the track data or subcomponent thereof. For example, the data can include an identification for the FIPPD associated with the account such as the PAN. The data can be read by the transit reader 220 such as a contactless reader reading a contactless payment card that has been issued by an issuer in a payment processing system. The transaction data can include the data read at the transit reader 220 along with other transaction information such as the date, the time of day, a merchant identification code, the location of the transit POS 240, etc.

At a second step, an optional validation request can be conducted at the transit POS 240 including rudimentary checks on the status of the FIPPD 130 or a variations of on-line issuer validation (e.g., authorization) with the payment processing system 180. For example, a transit validation can be requested. The transit validation might involve the expiration date of the FIPPD 130 being checked at the transit POS 240. Also, a Modulus 10 analysis, such as a Luhn algorithm, could be done at the transit POS 240, where a checksum formula is used to validate an identification number such as the PAN. Moreover, a balance inquiry can be formed in a communication addressed to the issuer 170. A balance inquiry may perform the function of initiating a quick check on the balance associated with a PAN on the payment processing system 180 associated with the FIPPD 130. The balance inquiry might not include a risk analysis that is sometimes done during the authentication component of a conventional transaction. Consequently, the balance check might be completed within the access period.

Alternatively, or in combination, the validation of the second step may include a check against the transit agency's white list or black list, maintained either at the transit POS 240 or at the transit central computer 270, to determine if the rider should be permitted access into the transit facility. The white list may be a list of data such as a hashed PAN associated with an eligible account that can be used to gain access to the transit facility. Similarly, the black list, may be a list of data associated with an ineligible account, such a hashed signature that cannot be used to gain access to the transit facility. Therefore, the white list or black list may consist of identifiers for portable payment devices, such as the PAN associated to the FIPPD 130 or a proxy thereof.

The transit agency may place a portable payment device on such a list (e.g., white or black) based on various parameters. For example, the portable payment device may have been reported stolen by a consumer, the portable payment device may have been a stored value card that has exhausted its value, or the portable payment device may have been used in a repeated fashion over a course of a day such that fraud may be suspected. Stated otherwise, the "velocity" with which the portable payment device is detected as having been used may indicate that fraud is being used to gain access to a transit facility; a transit agency may have a host of policies and rules that, when transgressed, place a portable payment device on the negative list. Each such list may be kept in the database 305 in communication with transit central computer 270 or at the transit POS 240.

The transit agency may also place a consumer device on a white list or black list based on a transmission originating from the payment processing system 180, such as a response to an issuer validation request. For example, the transmission may have included a notification from the issuer 170 that there has been a declined transaction involving the FIPPD 130 in the past or that the payment processing system's 180 risk assessment on the FIPPD 130, the transit system may use compared to the risk assessment to a transit toleration threshold for risk such that the transit agency may wish to place the FIPPD 130 on the negative list if the threshold is transgressed. Other responses to the issuer validation request may be a balance check response, a credit score response, an authorization response, or a combination thereof.

The white list or black list can be hosted at the transit POS 240 or at the database 305 in communication with the transit central computer 270 yet be accessible at the transit POS 240. When the list is hosted at the database 305, the white list or black list can be updated without having to make changes at each transit POS 240. The transit central computer 270 need not be a single computer. Rather, the transit central computer 270 may be a network of computers such as a network with nodes for a set of transit readers 220. The nodes may be connected to each other, either laterally and/or hierarchically.

At a third step, the transaction data can be transmitted to the transit central computer 270 for storage and analysis. The transit central computer 270 may use database 305 to contain transit transaction history for riders that use the transit system over time. The transit transaction history can include transaction information such as the date and time of a transit event, an identification of the transit POS 240, an identification of the transit agency, and at least some of the data read from the data storage region of the FIPPD 130. The transit transaction history can be updated with each FIPPD 130 event at the transit reader 220 or on a batch basis.

At a fourth step, the rider is given access to the transit facility. The transit facility may be a subway, a bus, a ferry, a trolley, a hover craft, a train, and other forms of transportation as are typically found within a transit system. The first through the fourth steps may occur off-line within a short period of time such as less than about one second or over a period of time not exceeding the access period (e.g., 300 ms). The first through the fourth steps repeat as respective riders interact with the transit POS 240.

At a fifth step, the transit transaction history stored in the third step may be accessed to calculate off-line (e.g., not in real time) the value of a fare using the stored transaction data and the transit agency policies. For example, a set of the transit transactions can be accessed based on the FIPPD 130 identification information, such as the FIPPD's 130 PAN; the set of transit transactions may then be ordered chronologically by transit events (e.g., entry, transfer, or exit); and the transit fare can be derived using the chronology of transit events based on predetermined transit agency rules and policies. For example, a transit agency may charge a transit fee based on predetermined fare policies, such as a flat fee of $2.00 (U.S.) for entry into the system. Other examples of predetermined fare policies include evaluating the fare value based on: an entry into the facility of the transit system; an exit from the facility of the transit system; a distance for one entry and a corresponding exit; a transfer from one facility of the transit system to another facility of the transit system; the sequential number of each transfer in a predetermined time period; a direction of travel in the transit system; a classification of the rider corresponding to the FIPPD 130 (e.g., concessions based on age, student status, or frequent ridership); peak and off peak travel time periods; a calendar holiday travel time period; and combinations of the foregoing. Those in the art are familiar with the potential rules and policies that may apply in calculating a transit fare.

Sometimes several FIPPDs 130 may have the same PAN. For example, a husband and wife may each have their respective FIPPDs 130 linked to their joint checking account. Alternatively, several employees of the same employer may each have respective FIPPDs 130 all being associated with a single account (e.g.; PAN) within the payment processing system 180. As such, the respective fare calculations for those employees using their respective FIPPDs 130 to commute during the same time within the transit system will need to take into consideration which card is being used by each employee within the same PAN.

At a sixth step, the transit agency may transmit one of more calculated fare values to the payment processing system 180 for collection based on various payment models. For example, the model used by the transit agency to request payment for the calculated fare values from the payment processing system 180 may be a pay per each use model, an aggregation of multiple calculated fare values model, or a pre-paid model.

In the pay per each use model, when the transit fare is determined the fare is transmitted to the payment processing system 180 for collection. Therefore, the transit fare may be directly sent to the payment processing system 180. Alternatively, the calculated transit fare may be batched with other calculated transit fares for a plurality of FIPPDs 130 over a period of time and then sent on an intermittent basis to the payment processing system 180 for collection.

Once the transit fare is sent to the payment processing system 180 it can be processed according to typical protocol for merchants 140. For example, each $2.00 transit fare can be authorized, settled, and cleared through the payment processing system 180, the transit agency can be paid, and the consumer can receive the assessed transit fare(s) in a monthly statement corresponding to their PAN.

In the aggregation model, the transit fare involving FIPPD 130 may be accumulated based on a predetermined algorithm prior to sending the transit fare to the payment processing system 180. The cumulated transit fares may be over time, over transit value, or over quantity. For example, the transit agency may accumulate transit fares involving the FIPPD 130 that occur over a week period prior to transmitting the aggregate set of fares to the payment processing system 180. Alternatively, the transit agency may accumulate transit fare values based on a threshold value. For example, once the accumulated transit fare value reaches twenty dollars ($20.00 US), the transit agency may transmit the aggregated set of fares to the payment processing system 180. In another example, the transit agency may accumulate the transit fare values based on the quantity of transit fares—such as when a rider has completed five (5) rides involving the same FIPPD 130 where each ride had its own fare value (e.g., $4.00, $0.50, $1.00, and $5.00 U.S. dollars), and then accumulate the fares and transmit the total value thereof to the payment processing system 180.

In the stored value model, the account associated with the FIPPD 130 is accessed through the payment processing system 180 at the transit system. For example, the rider can ask the transit agent at a payment booth to deduct an amount from the rider's credit card associated with the payment processing system 180 prior to the rider going to a turnstile to seek entry into a subway of the transit system. The transit agent may then conduct an on-line transaction with the payment processing system 180 so as to charge a value against the account, for example $50.00 (U.S. dollars). The transit system can then maintain a transit account associated with the FIPPD 130, for example, such that the transit account may be maintained at the transit central computer 270. When the rider wishes to take the subway, the rider may go to the turnstile, bring up the FIPPD 130 in proximity to the transit reader 220 in a contactless reading operation. The transit POS 240, in this case the turnstile, may transmit the transit event to the transit central computer 270 via the transit private network 260. Once a plurality of such transit events are completed for the PAN associated with FIPPF 130 (such as both an entry and an exit to the subway system for the rider), the transit fare can be calculated and deducted from the transit account at the transit central computer 270. In this case, the on-line transaction to record the transit event occurs before the off-line transaction of the transit central computer 270 to collect the aggregated set of fares from the payment system 180.

The rider may set up the transit account such that the account is "topped off" at predetermined intervals—such as when the end of the month arrives or when the transit account has reached a threshold lowest value such as $5.00 (U.S. dollars), whereby a predetermined amount is charged to the account that is associated with the FIPPD 130 in the payment processing system 180 Therefore, the transit system may conduct an on-line transaction, for example for $50.00 (U.S. dollars) with the payment processing system 180 once the predetermined interval is reached.

Figure 5:
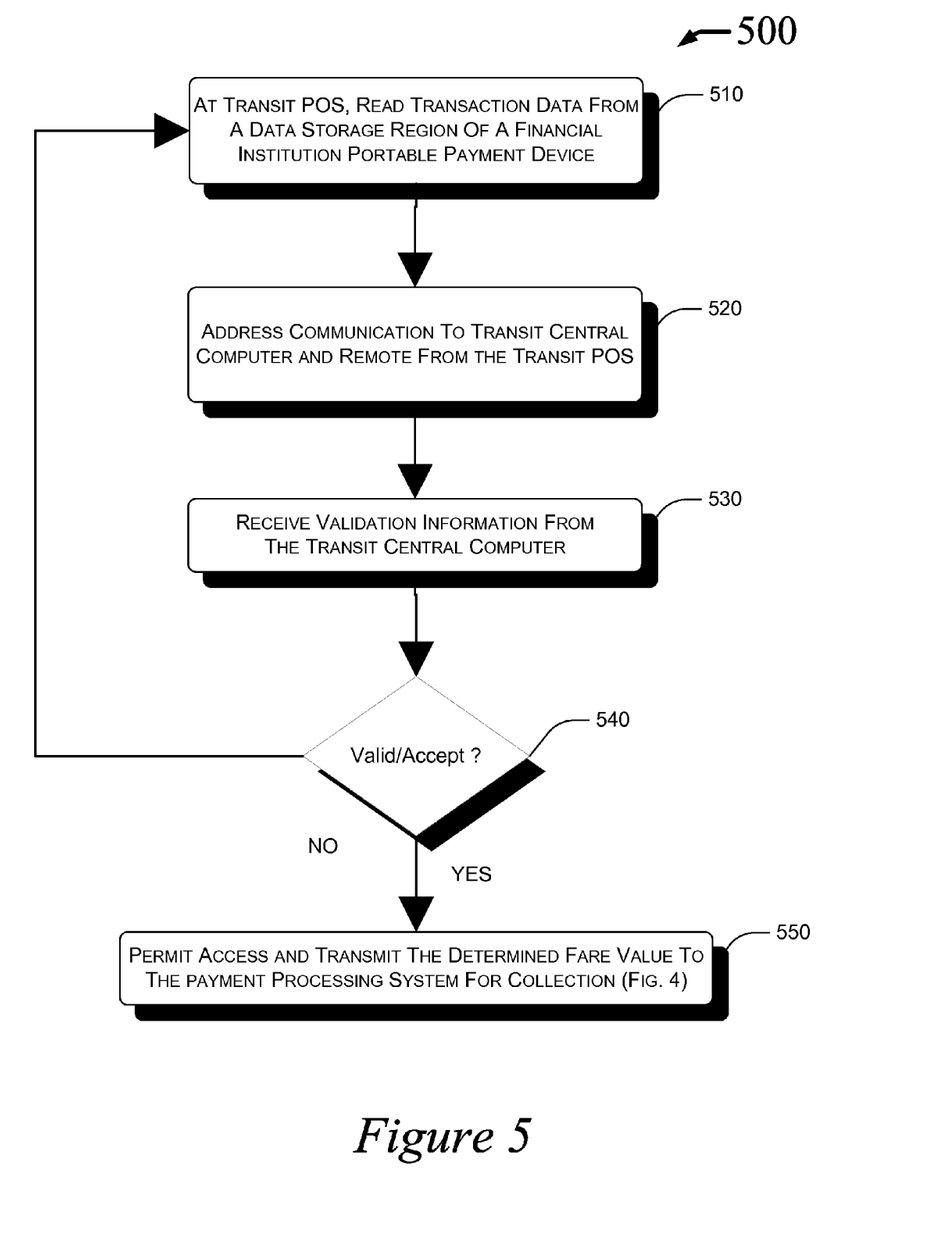
FIG. 5 is a flow chart illustrating an exemplary process through which a rider may gain access to an access facility using the FIPPD 130.

Referring to FIG. 5, a flow chart is used to illustrate an exemplary process 500 through which use a rider may gain access to the access facility using the FIPPD 130. At step 510, the data from the data storage region of the FIPPD 130 is read at the transit reader 220. The data can be associated with a particular account within the payment processing system 180. The data may be static or dynamic. Static data is data that does not change with each use of the FIPPD 130, such as the PAN. On the other hand, dynamic data is data that may change with the use of the FIPPD 130, such as a counter that is stored in a smart card, where each usage of the smart chart decrements or increments the counter. The data may be, for instance, the full track data or portions thereof for the FIPPD 130. Also, the data may be in a magnetic stripe data (MSD) format.

Optionally, as deterrence to fraud by theft of transit and payment system information, the data can be obscured, for example by converting it to a proxy number, by hashing the data in an algorithm executed either remotely or at the transit POS 240. Moreover, the hashed data may be truncated. The data, along with other data about the rider's request for access to the transit facility, can be stored as transit transaction data. These transit transaction data can include information such as the date, the time of the transit transaction, and/or an identification of the transit POS 240. This transit transaction data can be stored at the transit POS 240 and can be transmitted to the transit central computer 270 via the transit private network 260 for further storage, processing, or analysis.

At step 520, a communication is formed that is addressed to the transit central computer 270. This communication is transmitted over the transit private network 260. The address may be in the form of an Internet Protocol address for network transmission or other form of an address that will uniquely identify a recipient. The communication may also include the data read, a proxy thereof, and/or the full transit transaction data. One purpose of this communication can be to request a response from the transit central computer 270 as to whether or not a transit validation should be given at the transit POS 240 for the rider to use its FIPPD 130 to gain access to a facility in the transit system. The requested transit validation may be, for instance, based on a check of the read data against a white list or black list containing identifiers of eligible and ineligible accounts, respectively, that may be maintained in, for example, at the database 305 in electrical communication with the transit central computer 270. Furthermore, the requested transit validation may be based on a modulus 10 or expiration date check. For example, the transit validation process may result in a denial for access into the access facility because the FIPPD 130 has an expiration date that has passed. As stated previously, the white list or black list may be created based on the transit system policies for transit validation and/or the payment processing system's 180 responses to the issuer validation request.

In step 530, the transit POS 240 receives back the response to the requested transit validation from the transit central computer 270 in a transmission over the transit private network 260. The response may include information in various forms. For example, the information may be in a form that includes a message that the transit POS 240 (e.g.; a turnstile) should decline access to the rider seeking to enter the transit facility; the information may be in a form so as to include a message indicating that the rider is allowed access to the transit facility; the information may be in a form so as to include a message that the rider is to be assessed a discounted fare on the basis of the rider's status (e.g.; a student rider status, an elderly rider status, etc.) Also, the response to the requested transit validation may include combinations of the foregoing information in one or more other forms.

At step 540, a query is performed upon the response to the requested transit validation. If the response indicates that the rider may enter the transit facility, the process 500 moves to step 550 at which step the rider is permitted to access the transit facility. Alternatively, if the query determines that rider is declined such access, the rider can have a further option to present a different FIPPD 130 for subsequent and new consideration of the rider's access to enter the transit facility.

Alternatively, the transit validation at step 540 may be conditional. For example, if the response to the requested transit validation indicates that the FIPPD 130 is only authorized for a discounted fare based on the rider's status, such as a fare discount given to only elderly riders, then a transit agent located at the transit POS 240 may decline the rider's entry into the transit facility if the transit agent observes that rider does not meet the criteria for the discounted fare. By way of illustration, if a grandfather lends his FIPPD 130 to his grandson for use of the transit system for a day, an observation by the transit agent of the grandson may result in the transit agent denying the grandson access to the transit facility at the elderly rider status discounted fare.

Process 500 repeats steps 510 through 550 for each rider presenting the FIPPD 130 at a transit reader 220. Preferably, these steps, including the step of receiving back the response to the requested transit validation from the transit central computer 270, will occur in a short period of time, more preferably in less that about one second, and most preferably in an access period of about 300 ms.

Figure 6:
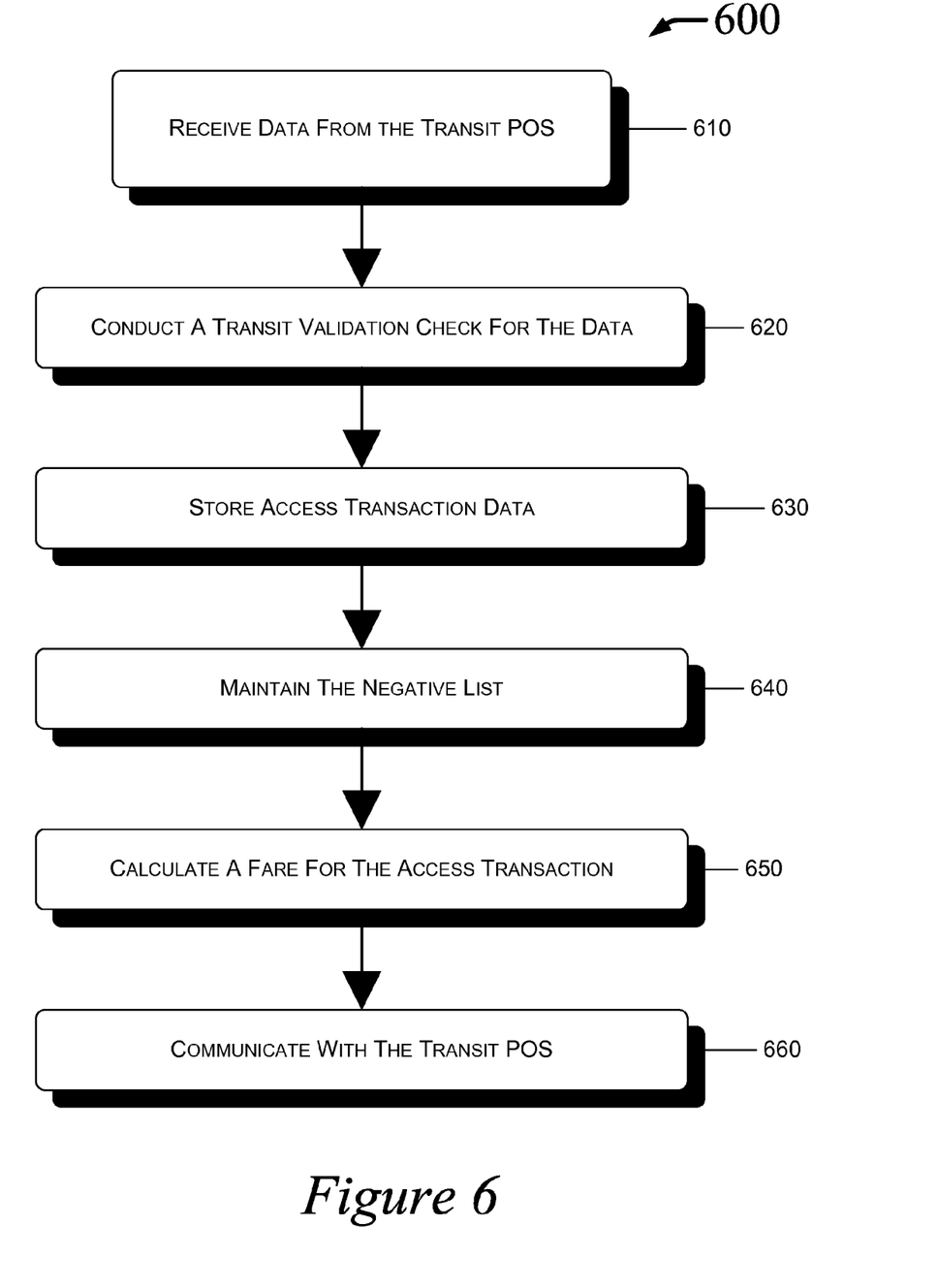
FIG. 6 is a flow chart illustrating an exemplary process for validating a rider's use of a financial institution portable payment device at a transit system for access to a transit facility.

Referring to FIG. 6, a flow chart of a process 600 illustrates an implementation for validating a FIPPD 130 at the transit system for access by a rider to the transit facility. Process 600, for each rider, begins at step 610 where the transit reader 220 reads data from the FIPPD 130 which may include the data that will be later validated. Other data for the requested transit transaction data can also be obtained, such as the time of day and date of the access. Process 600 then moves to step 620.

At step 620, a transit validation is determined for the data (e.g., the PAN of the account within the payment process system 180 read off of the FIPPD 130) to determine if the FIPPD 130 may be used to gain access into the access system (e.g., transit system). A white list, a negative list, or a combination thereof may be used to determine such transit validation. For example, the transit central computer 270 may have a database 305 containing the status of a plurality of the FIPPDs 130 associated with respective riders. These data can be cataloged based on the track data of the FIPPD 130, signature data of the FIPPD 130, the account (e.g. the PAN), or proxies thereof.

In one implementation, an indicator associated with the FIPPD 130 can be used in order to place the FIPPD 130 on a negative list. An evaluation of the indicator, for instance, can be based on transit system policy. These indicators can be derived by the transit system internally, they can be received in a communication from the payment processing system 180, or both. For instance, the indicator can be a velocity of usage indicator corresponding to a degree of usage of the FIPPD 130 within a predetermined time period (described above), a lost card indicator, a stolen card indicator, an expiration date indicator, an exhausted stored value card balance indicator, and combinations thereof. By way of illustration, a rider offering the FIPPD 130 for access to a transit facility where the FIPPD 130 has an expiration date prior to the date of offering the FIPPD 130, may cause the transit POS 240 to set an indicator for the corresponding account such that the rider will be denied access to the transit facility. Optionally, the transit POS 240 may then send a transmission that includes the indicator and the corresponding account to the transit central computer 270 for storage in the database 305 on the negative list maintained thereat, for instance at step 630.

Also at step 630 of process 600, the transit transaction data obtained at step 610 may be stored in the database 305 and/or at the transit POS 240. The stored transit transaction data can later be submitted for batch processing by the transit central computer 270, where such batch processing may also include analysis of the stored transit transaction data such as for ridership trends, fare evaluation, and collection of fares.

At step 640, the transit central computer 270 performs one or more maintenance procedures on one or more lists stored in the database 305. For these maintenance procedures, the transit agency may have various policies that require an account, indicators thereof, and the like to be added to or remove from such lists. For example, one such list may include a plurality of indicators for accounts that include all or a portion of the PAN associated with the account. One such list can be a negative list and another such list can be a white list. Reasons for list maintenance are readily understood by those of skill in the relevant arts and can be as are mentioned above, such as reasons derived internally by the transit system as well as reasons based upon information received by the transit system in communications from the payment processing system 180. For example, the issuer 170 of a bank card may communicate to the transit system information to the effect that the bank card is to be denied any and all transactional use. This information would then be used by the transit system to add the account of the bank card to the negative list stored in the database 305. By way of another illustration, the issuer 170 may have declined use of the FIPPD 130 at a grocery store the previous day because the debit account associated with the FIPPD 130 was overdrawn. The payment processing system 180 may transmit a communication of the denial to the transit central computer 270 indicating that the FIPPD 130 should not be validated for use. Subsequently, the transit central computer 270 can add the account for the FIPPD 130 to the negative list that is maintained in the database 305. In like manner, the payment processing system 180 may send a risk analysis on the FIPPD 130 that the transit central computer 270, based upon a policy program, may deem to be above a tolerated threshold exposure or risk, resulting in the transit central computer 270 adding the FIPPD 130 to the negative list.

Optionally, at step 650, the transit fare for the access transaction can be calculated based on transit transaction history and transit system policy by use of related transact transaction data obtained for a rider's FIPPD 130 at each step 610. As stated previously, a transit fare can be determined by applying transit rules to transit events involving FIPPD 130 over a period of time. Here, the calculation can occur at the transit central computer 270 by execution of a fare policy program.

At step 660, the transit central computer 270 addresses a communication to the transit POS 240. The communication, which generally includes a transit validation or denial thereof for the rider's access to a transmit facility, may include, for example, the result of the negative list check so as to indicate whether the rider may be permitted access to the transit facility due to transit validation contained in the communication. The communication may also indicate that the rider will be assessed a discounted fare based upon the rider's status (e.g.; an elder or minor rider fare) or an undiscounted fare.

Process 600 repeats steps 610 through 660 for each rider presenting the FIPPD 130 at the transit reader 220. Preferably, these steps, including the step of conducting the transit validation check, will occur in a short period of time, more preferably in less that about one second, and most preferably in an access period of about 300 ms.

Figure 4:
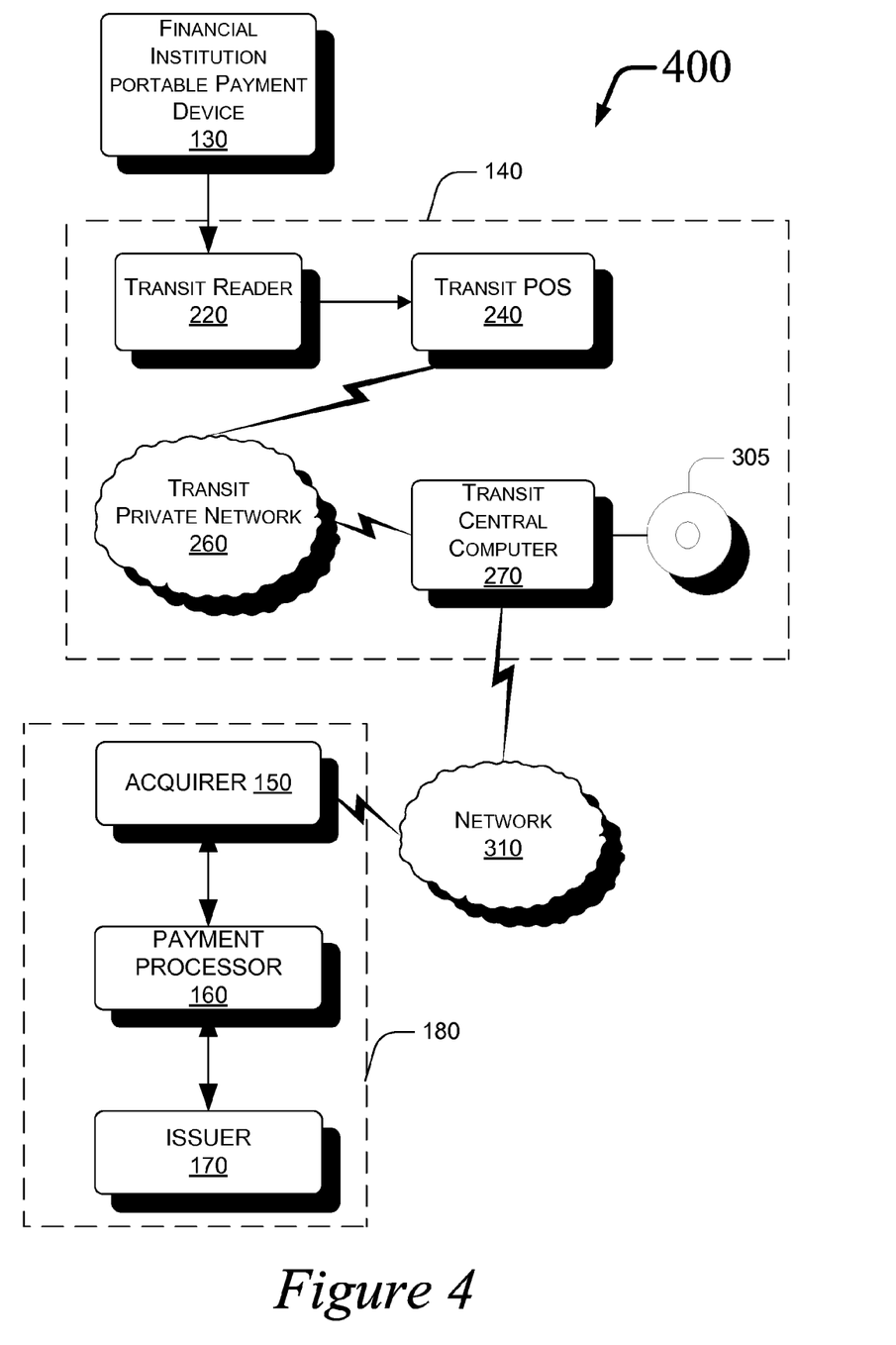

Following process 600 for a plurality of riders and their respective transit transactions, fares for such riders can be submitted by the transit system for collection from the payment processing system 180 as seen in FIG. 4 at steps 450-460.

Signature Creation and Use in Off Line Transaction

Given the forgoing discussion of various implementations of lists in general, including white and negative lists and their respective uses, the following discussion pertains to particular implementations of such lists such that, if any such list were to be stolen or compromised, the stored numbers would not be a valid payment account such as the Primary Account Number (PAN), and such that the stored numbers would not be useable as payment numbers to conduct transactions in or outside of the applicable merchant's organization (e.g.; a transit system). Moreover, by turning such lists into a list of non-payment account numbers (e.g.; such as a unique card identifier) could provide yet another level of security beyond that already provided the issuer or its corresponding payment processing system. For instance, some payment processing systems require that any stored cardholder data, such as PAN, be encrypted. The negative lists, being made of PAN data, would necessarily be encrypted according to these requirements. The process of de-encrypting such a list at the time of a negative list look up may take too long for the transit environment '300 millisecond' timing standard. By using non-payment account numbers (e.g.; unique card identifiers), the negative list would be made of non-PAN card signatures that do not require decryption at the time of the transaction. As such, transaction times are faster, such as are required in the public transportation environment.

In sum, the implementation of various lists, including white and negative lists, de-link the payment account number for financial payments from the value or number used for negative listing. As such, there is a separation of the proprietary payment number owned by the issuer of the payment card or device from the negative list number managed by a merchant.

Figure 7:
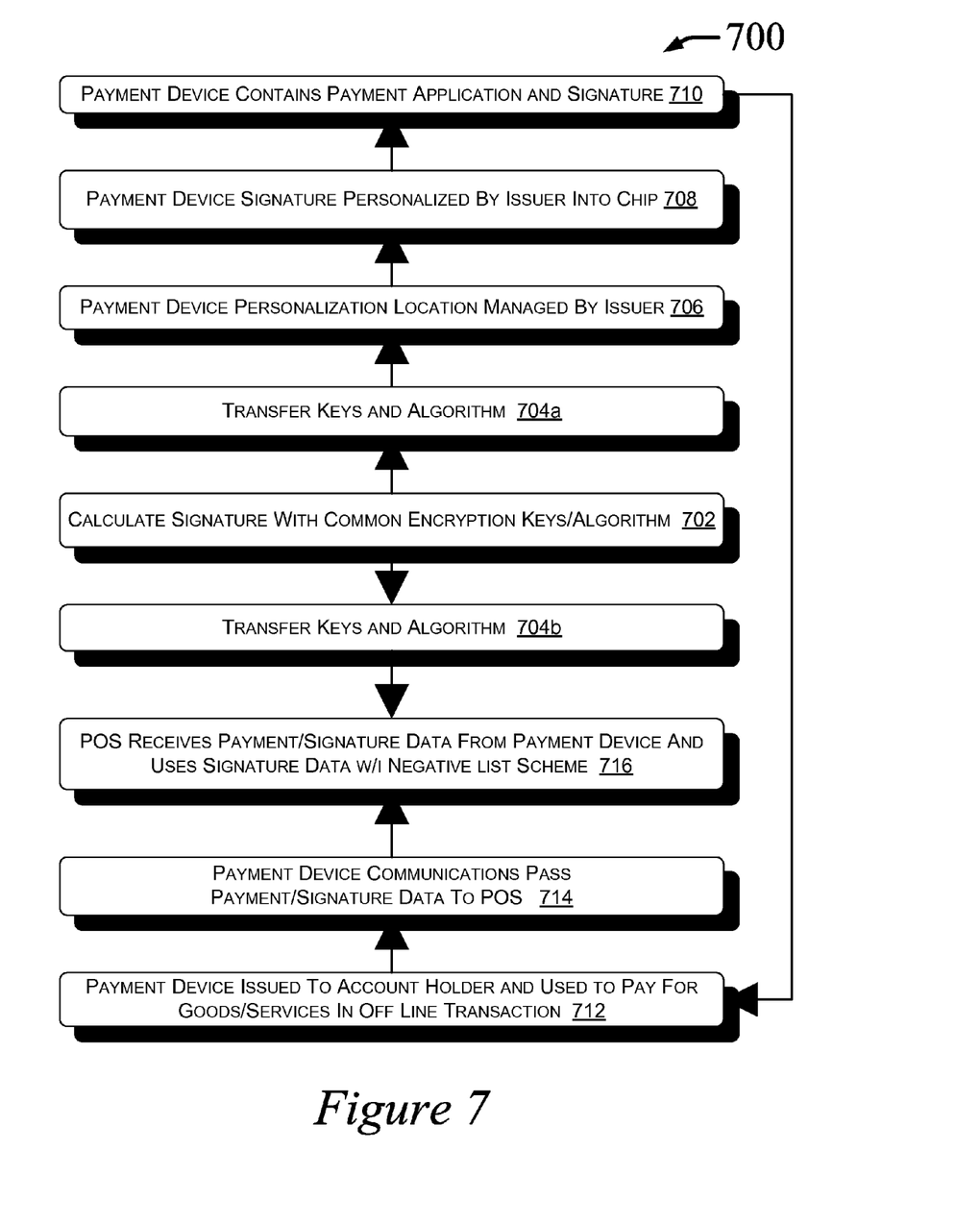
FIG. 7 is a flow chart illustrating an exemplary process of creating a proxy unique to an account issued by a financial institution, where the proxy is on a portable payment device issued by the financial institution, where the portable payment device can be used by a consumer in a transaction with a merchant, and where the merchant can check the unique proxy against a list of other such proxies to determine whether to complete the transaction with the consumer.

Referring now to FIG. 7, a flow chart of a process 700 illustrates an implementation that obscures of separates a proprietary payment number owned by an issuer of the payment device or card from a negative list number managed by a merchant, where a consumer uses the payment device or card to conduct a transaction for a good or service with the merchant, and where the merchant checks the obscured version of the proprietary payment number against a negative list in an off line operation.

Process 700 includes step 702 at which a calculation of a signature is performed by the use of a common encryption key or keys as well as a predetermined algorithm. The algorithm can be used to create a cryptographic value that is stored within chip data of a contact or contactless payment card. The algorithm can utilize one or more encryption keys that may be of either a symmetric type (i.e.; DES or 3 DES) or an asymmetric type (i.e. public key infrastructure). The mathematical equation or algorithm may produce a hash, certificate, or signature utilizing payment device or payment card data that is unique to that payment device or payment card. Some of the variables used in the algorithm may include, but need not be limited to, the cardholder's name, a partial account number, expiry data, service code, etc. These variables can have their base in the original Track 1 and/or Track 2 data fields of the payment device/card in accordance with a magnetic stripe data (MSD) configuration.

At step 704a and 704b, the keys and algorithm can be transmitted to the devices at the issuer of the payment device or payment card (e.g.; the issuing bank) that will personalize the signature onto the payment device/card, and to the Point of Service Terminals (POS) or there device that will read and validate the card signature code during the negative list processing at the time of the transaction.

At step 706 of process 700, a payment device/card personalization can take place at a location that is managed by the issuer of the payment device/card. As seen in step 708, a bank personalization system can load the appropriate card signature code into a smart card (i.e.; into chip or other semiconductor storage device) based on personalized algorithm and keys, along with any other data that is intended to be personalized at that time. These values may be included in additional data tags that are read from the storage of the smart card at the time of the transaction at the POS terminal. As such, at step 710, the payment device/card (e.g.; a smart card) contains any application data and other information for an offline payment transaction including the personalized signature.

Process 700 then moves to step 712. At step 712 the payment device/card can be given to an account holder by the issuer. The issuer intends that the account holder will use the payment device/card in one or more transactions, some which are likely to be off line transaction at a merchant that uses a negative list to check the validity of payment devices/cards. For example, the issuer might mail the payment device/card to a cardholder. Once received and activated by the cardholder, the card may be used at any merchant.

At step 714, for each consumer, a POS terminal reads data from the payment device/card as it is offered by the consumer to a merchant for the purchase of goods and/or services. By way of example of process 700, for each rider of a transit system seeking access to a facility of the transit system, a transit reader 220 reads data from the FIPPD 130. Other data for the requested transit transaction data can also be obtained.

At the POS terminal, at step 716, the payment device/card can be read by a chip card reader (i.e.; a contact or contactless reader). Here, the payment data is read from the payment device/card to enact the payment transaction, and the POS terminal also reads the payment device/card signature data. The signature, so read, may then be used in the negative listing process such as has been described above, including in the description of process 600 in FIG. 6. In such a process, the list, white, negative, or other, is so obscured as to the payment data on the payment device/card so that there is provided security to account holder and merchant as will as the minimization of fraudulent transactions.

It should be understood that the present invention can be implemented in the form of control logic, in a modular or integrated manner, using software, hardware or a combination of both. Based on the disclosure and teachings provided herein, a person of ordinary skill in the art will appreciate other ways and/or methods to implement the present invention.

It is understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method comprising a plurality of steps each being performed by hardware executing software, wherein the steps include:

reading data at a point of service (POS) terminal at a merchant, wherein:

a payment device is read by the POS terminal when presented in proximity thereto by a consumer seeking to conduct a transaction for a good or service from the merchant;

the payment device includes an encryption code for a Primary Account Number (PAN) of an account issued to the consumer by an issuer;

the POS terminal is not in real time communication with the issuer;

the encryption code is an encryption of at least the PAN; and the data read from the payment device includes the encryption code and a non-PAN signature that corresponds to the PAN;

without decrypting the encryption code to derive the PAN:

checking a list of non-PAN signatures maintained by the POS terminal to determine if the non-PAN signature read from the data on the payment device is on the list; and permitting, on the basis if whether the non-PAN signature is on the list, the consumer to complete the transaction with the merchant; and sending, from the POS terminal, information corresponding to the transaction, including the encryption code read by the POS terminal, for delivery to and use by an acquirer for the merchant for clearing and settlement with the issuer of the account to receive payment for the transaction from the account.

2. The method as defined in claim 1, wherein the non-PAN signature is created by the issuer using at least one of:
one or more encryption keys; and
a predetermined algorithm.

3. The method as defined in claim 2, wherein at least one said encryption key is a type selected from the group consisting of a symmetric type and an asymmetric type.

4. The method as defined in claim 3, wherein the asymmetric type is a public key infrastructure.

5. The method as defined in claim 3, wherein the symmetric type encryption key includes one of Data Encryption Standard (DES) or triple DES.

6. The method as defined in claim 3, wherein the asymmetric type includes a public key infrastructure.

7. The method as defined in claim 2, wherein the predetermined algorithm produces a result selected from the group consisting of a hash, a certificate, a signature utilizing data stored on the payment device that is unique to that payment device.

8. The method as defined in claim 2, wherein the predetermined algorithm includes one or more variables each of which is selected from the group consisting of the name of an account holder corresponding to the payment device, a partial PAN, expiry data of the payment device, and a service code of a payment processing system that corresponds to the PAN of the payment device.

9. The method as defined in claim 8, wherein the one or more variables are stored in the payment device in Track 1 and/or Track 2 data fields in accordance with a magnetic stripe data (MSD) configuration.

10. The method as defined in claim 1, wherein the non-PAN signature is static on the payment device.

11. The method as defined in claim 1, wherein the reading data further comprises storing information for each said transaction.

12. The method as defined in claim 11, wherein the information stored for each said transaction comprises the date and time thereof, an identification of the POS terminal of the merchant, and at least some of the data read from a data storage region of the payment device.

13. The method as defined in claim 12, wherein the data read from the data storage region of the payment device is stored in a format selected from the group consisting of:
either Track 1 or Track 2 data fields of the payment device in accordance with a magnetic stripe data (MSD) configuration; and
a data track that is compatible with a payment processing system that processes data in accordance with a magnetic stripe data (MSD) configuration.

14. The method as defined in claim 12, wherein the data read from the data storage region of the payment device is read contactlessly.

15. The method as defined in claim 1, wherein the payment device is selected from the group consisting of a credit card, a debit card, a stored value card, a contactless payment device, and combinations thereof.

16. The method as defined in claim 1, wherein the payment device is within a mobile device selected from the group consisting of a personal digital assistant, a wireless telephone, and an expert system including a substrate having embedded therein a contactless element including a chip capable of use as a transaction payment mechanism for each said transaction.

17. The method as defined in claim 1, wherein the reading, the checking, and the permitting are all performed within a time period not exceeding one (1) second.

18. A non-transient computer-readable medium comprising tangibly embodied instructions executable by hardware to perform the steps of the method of claim 1.

19. The method as defined in claim 2, wherein the hash data is truncated.

20. A method comprising a plurality of steps each being performed by hardware executing software, wherein the steps include:
for each of a plurality of transactions respectively conducted at a respective POS terminals at respective facilities of a merchant, wherein the plurality of transactions correspond to a single cost for a single good or service of the merchant by a single consumer:
reading data at the POS terminal at the facility of the merchant, wherein:
a payment device is read by the POS terminal when presented in proximity thereto by the single consumer seeking to conduct the transaction for the single good or service from the merchant;
the payment device includes an encryption code for a Primary Account Number (PAN) of an account issued to the single consumer by an issuer in a payment processing system;
the POS terminal is not in real time communication with the issuer;
the encryption code is an encryption of at least the PAN; and
the data read from the payment device includes:
the encryption code; and
a non-PAN signature that corresponds to the PAN;
without decrypting the encryption code to derive the PAN:
checking a list of non-PAN signatures maintained by the POS terminal to determine if the non-PAN signature read from the data on the payment device is on the list; and
permitting, on the basis if whether the non-PAN signature is on the list, the consumer to complete the transaction with the merchant; and sending, from the POS terminal, information corresponding to each of the plurality of transactions, the information including the respective said encryption code read by the POS terminal, for delivery to an acquirer for the merchant for clearing and settlement with the issuer of the account to receive payment from the account for a currency amount of the single cost for the single good or service of the merchant by the single consumer.

21. A non-transient computer-readable medium comprising tangibly embodied instructions executable by hardware to perform the steps of the method of claim 20.

22. A method comprising a plurality of steps each being performed by hardware executing software, wherein the steps include:
  reading data at a point of service (POS) terminal at a merchant, wherein:
    a payment device is read by the POS terminal when presented in proximity thereto by a consumer seeking to conduct a transaction for a good or service from the merchant;
    the payment device includes an encryption code for a Primary Account Number (PAN) of an account issued to the consumer by an issuer;
    the POS terminal is not in real time communication with the issuer;
    the encryption code is an encryption of at least the PAN; and
    the data read from the payment device includes the encryption code and a non-PAN signature that corresponds to the PAN and was created by the issuer using a predetermined algorithm that includes one or more variables stored in the payment device in Track 1 and/or Track 2 data fields in accordance with a magnetic stripe data (MSD) configuration;
  storing information for each said transaction including:
    the date and time of the transaction;
    an identification of the POS terminal of the merchant; and
    at least some of the data read from a data storage region of the payment device that is stored in a format selected from the group consisting of:
      either Track 1 or Track 2 data fields of the payment device in accordance with a magnetic stripe data (MSD) configuration; and
      a data track that is compatible with a payment processing system that processes data in accordance with a magnetic stripe data (MSD) configuration;
  without decrypting the encryption code to derive the PAN:
    checking a list of non-PAN signatures maintained by the POS terminal to determine if the non-PAN signature read from the data on the payment device is on the list; and
    permitting, on the basis if whether the non-PAN signature is on the list, the consumer to complete the transaction with the merchant; and
  sending, from the POS terminal, information corresponding to the transaction, including the encryption code read by the POS terminal, for delivery to and use by an acquirer for the merchant for clearing and settlement with the issuer of the account to receive payment for the transaction from the account.

23. A non-transient computer-readable medium comprising tangibly embodied instructions executable by hardware to perform the steps of the method of claim 22.

* * * * *